United States Patent
Ryan et al.

(10) Patent No.: US 7,644,975 B2
(45) Date of Patent: Jan. 12, 2010

(54) MOUNTING ARRANGEMENT FOR MOUNTING CLADDING TO VEHICLE BODY

(75) Inventors: James P. Ryan, Powell, OH (US); Andrew K. Swayne, Dublin, OH (US); Jeremy J. Weinandy, Dublin, OH (US); Jason B. Ruminski, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 11/695,998

(22) Filed: Apr. 3, 2007

(65) Prior Publication Data
US 2008/0246303 A1    Oct. 9, 2008

(51) Int. Cl.
B60R 13/02    (2006.01)
(52) U.S. Cl. .............. 296/136.01; 24/297; 296/1.08
(58) Field of Classification Search ............. 24/297; 52/716.1, 716.5, 716.6, 716.7; 280/762, 280/770; 293/126, 128; 296/1.08, 39.1, 296/136.01, 146.7; 428/31
See application file for complete search history.

(56) References Cited

U.S. PATENT DOCUMENTS

| | | | |
|---|---|---|---|
| 3,505,772 A * | 4/1970 | Claire et al. ................... 52/511 |
| 4,363,839 A | 12/1982 | Watanabe et al. |
| 4,388,355 A * | 6/1983 | Ikemizu ....................... 428/31 |
| 5,288,530 A * | 2/1994 | Maki ............................ 428/31 |
| 5,320,151 A | 6/1994 | Wumer |
| 5,915,767 A * | 6/1999 | Hosoda et al. .............. 293/126 |
| 6,095,594 A | 8/2000 | Riddle et al. |
| 6,179,359 B1 * | 1/2001 | Clauson et al. ............ 296/39.1 |
| 6,419,307 B1 | 7/2002 | Maruyama et al. |
| 6,722,730 B2 | 4/2004 | Lydan et al. |
| 6,772,484 B2 * | 8/2004 | Miyano et al. ................ 24/297 |
| 6,824,201 B2 | 11/2004 | Miyazaki |
| 6,863,327 B2 | 3/2005 | Granger et al. |
| 6,959,954 B2 | 11/2005 | Brandt et al. |
| 7,272,873 B2 * | 9/2007 | Nessel et al. .................. 24/297 |
| 2003/0071475 A1 * | 4/2003 | Abejon et al. ............. 296/39.1 |
| 2004/0061348 A1 * | 4/2004 | Takeda et al. ............. 296/1.08 |
| 2005/0016116 A1 * | 1/2005 | Scherff ...................... 52/716.6 |
| 2005/0116485 A1 * | 6/2005 | Kuroda ..................... 296/1.08 |
| 2005/0236861 A1 * | 10/2005 | Slobodecki et al. ........ 296/39.1 |
| 2005/0241259 A1 * | 11/2005 | Rijsbergen et al. ......... 52/716.1 |
| 2007/0234527 A1 * | 10/2007 | Aoyama ...................... 24/297 |

* cited by examiner

Primary Examiner—Glenn Dayoan
Assistant Examiner—Paul A Chenevert
(74) Attorney, Agent, or Firm—Mark E. Duell; Rankin, Hill & Clark LLP

(57) ABSTRACT

A mounting arrangement for securing a cladding to a vehicle body includes a vehicle body defining at least one aperture and a cladding having a body portion and at least one integral attachment structure extending from the body portion. The attachment structure includes a retaining portion received through the at least one aperture for securing the body portion to the vehicle body and a plurality of spaced apart ribs connecting the retaining portion to the body portion.

19 Claims, 4 Drawing Sheets

MOUNTING ARRANGEMENT FOR MOUNTING CLADDING TO VEHICLE BODY

BACKGROUND

The present disclosure generally relates to the mounting of cladding to an exterior of a vehicle body and more particularly relates to an improved attachment structure for mounting the cladding to the vehicle body. In one embodiment, a cladding mounting arrangement includes a vehicle body defining at least one mounting aperture and a vehicle cladding for mounting to the vehicle body. The cladding including a main body or panel portion having an exterior surface and an interior surface with an attachment structure thereon. The attachment structure includes a retaining portion for receipt within the aperture of the vehicle body and an attachment portion connecting the attachment structure to the cladding main body portion. The improved attachment structure will be described with particular reference to this embodiment, but it is to be appreciated that it is also amenable to like applications.

Many vehicles include a cladding, such as a molded plastic cladding, attached to an exterior of a vehicle body. For example, a cladding in the form of a panel can be attached to the vehicle body in a quarter panel area thereof for purposes of enhancing the vehicle's appearance. One often employed means for attaching the cladding to the vehicle body is to incorporate a molded-in or integral clip or attachment structure into the cladding that can be secured, sometimes releasably, within an aperture provided in the vehicle body. For example, a cladding panel could have a plurality of molded-in attachment structures extending from an inside or interior surface of the cladding and releasably received in corresponding apertures defined in the vehicle body for mounting the cladding to the vehicle body.

A concern in using such molded-in or integral attachment structures with plastic cladding is the possible appearance of sink marks on an exterior or appearance surface of the cladding, particularly when the appearance surface is to be smooth and/or painted in its final state (i.e., the state in which the vehicle is sold to a customer). Sink marks are often considered unsightly and unless disguised can lead to a perceived unsightly appearance of the vehicle to which cladding having such sink marks is mounted.

Many automotive manufacturers have attempted to address the problem of sink marks appearing on the exterior surface of plastic cladding. Heretofore, one of the commonly employed techniques for addressing the issues of sink marks has been to utilize a separate clip received in a doghouse structure for attaching the cladding to the vehicle body. Use of the separate clip has the drawback of increasing manufacturing costs of the vehicle and the employment of a doghouse structure may have the same problem of causing sink marks to appear on the exterior surface of the cladding. Another countermeasure has been to provide the cladding with a textured exterior surface so as to disguise any occurrences of sink marks. The obvious drawback of this arrangement is that it eliminates the possible use of smooth exterior surfaces on vehicle cladding. In addition, textured surfaces may not be suitable for painting applications (i.e., the application of paint to the cladding exterior surface).

Accordingly, there is a need for a suitable attachment structure for securing a cladding to a vehicle body that does not result in unsightly sink marks showing on the appearance surface of the cladding, particularly where the cladding exterior surface is to be smooth and/or painted. Moreover, there is a competing desire for any attachment structures for securing cladding to a vehicle body to avoid resulting in high manufacturing costs or resulting in a weakened connection to the vehicle body.

SUMMARY

According to one aspect, a mounting arrangement for securing a cladding to a Vehicle body is provided. More particularly, in accordance with this aspect, the mounting arrangement includes a vehicle body defining at least one aperture. A cladding has a body portion and at least one integral attachment structure extending from the body portion. The attachment structure includes a retaining portion received through the at least one aperture for securing the body portion to the vehicle body and a plurality of spaced apart ribs connecting the retaining portion to the body portion.

According to another aspect, a mounting arrangement for attaching a cladding to a vehicle body is provided. More particularly, in accordance with this aspect, the mounting arrangement includes a cladding member having a body portion and a plurality of attachment structures. A vehicle body includes a corresponding plurality of apertures. Each of the apertures is adapted to receive an associated one of the plurality of attachment structures. Each of the plurality of attachment structures includes a plurality of spaced apart ribs extending from the body portion and supporting a retaining portion of the attachment structure in spaced relation relative to the body portion for hooking engagement onto the vehicle body.

According to yet another aspect, a cladding mounted to a vehicle body is provided. More particularly, in accordance with this aspect, the cladding mounted to a vehicle body includes a cladding panel having at least one attachment structure releasably received through at least one aperture defined in a vehicle body. The at least one attachment structure includes a retaining portion having a width received through the at least one aperture. The retaining portion is spaced apart from the cladding panel and is connected thereto by a plurality of spaced apart ribs which are spaced apart along said width of said retaining portion.

DETAILED DESCRIPTION

Figure 1:
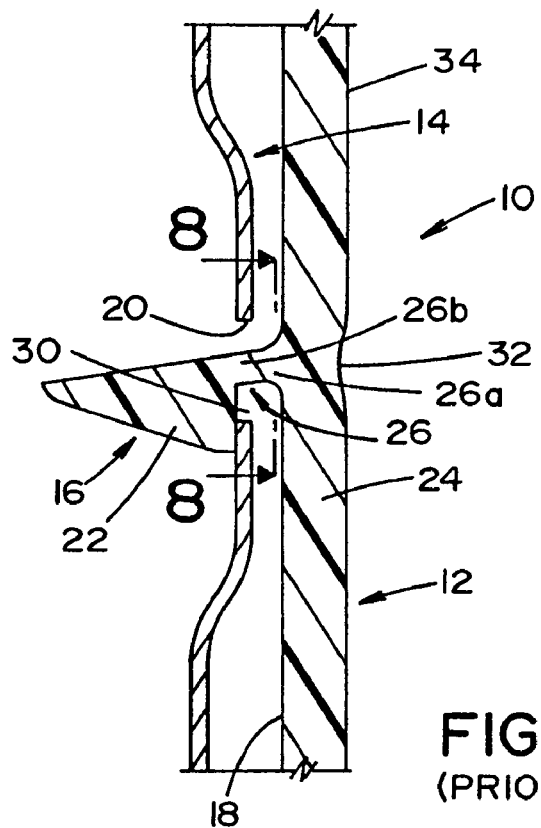
FIG. 1 is a cross-sectional view of a prior art mounting arrangement including a cladding having an attachment structure received in an aperture of a vehicle body for mounting the cladding to the vehicle body.

Referring now to the drawings wherein the showings are for purposes of illustrating one or more exemplary embodiments, FIG. 1 depicts a prior art mounting arrangement 10 for securing a cladding 12 to a vehicle body 14. The cladding 12 of the prior art mounting arrangement 10 includes an attachment structure 16 integrally formed with the cladding and extending from an attachment or interior surface 18. More specifically, the attachment structure 16 is received through an aperture 20 defined in the vehicle body 14 for securing the cladding 12 to the vehicle body 14. Of course, although only a single attachment structure 16 is shown as being received through a single aperture 20 in the vehicle body 14, it is to be appreciated and understood by those skilled in the art that the cladding 12 may include any number of attachment structures 16 for receipt in corresponding apertures 20 defined in the vehicle body 14.

The cladding 12, and specifically the attachment structure 16, includes a retaining portion 22 secured to a main body or panel portion 24 of the cladding 12 by an attachment portion 26. As illustrated, the attachment structure 16, also referred to herein as a molded-in clip, is integrally formed as part of the cladding 12 and with the main body or panel portion 24. The retaining portion 22 of the attachment structure 16 is received through the aperture 20 to releasably secure the cladding 12 to the vehicle body 14.

Figure 2:
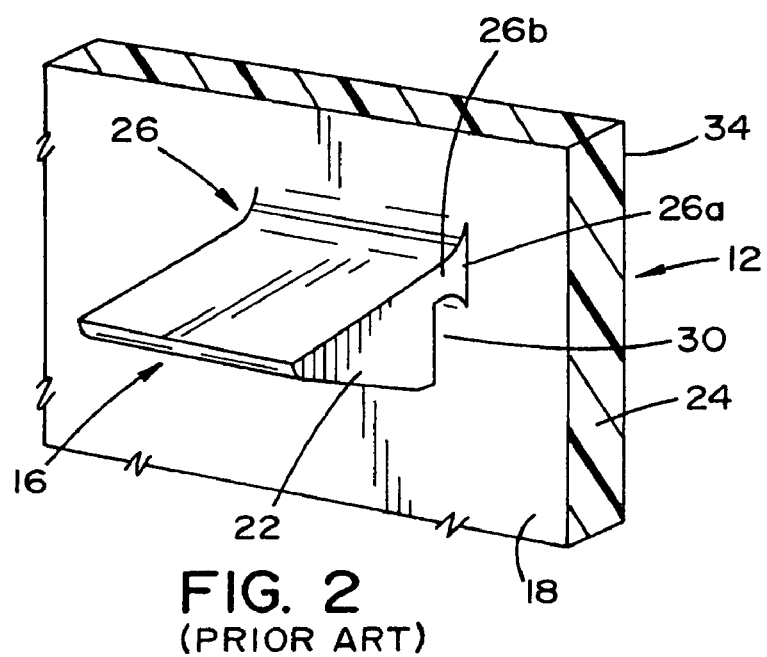
FIG. 2 is a partial perspective view of the attachment structure of the cladding of FIG. 1.

With additional reference to FIG. 2, the attachment portion 26 of the attachment structure 16 is generally formed as a horizontal rib which physically connects the retaining portion 22 to the body portion 24. As illustrated, the attachment portion is shaped like a pedestal in that includes a base 26a adjacent or directly attached to the interior surface 18 of the cladding 12. From this base 26a the pedestal-shaped attachment portion 26 narrows in width as it extends away from surface 18 forming a bridge portion 26b that positions the retaining portion 22 in spaced relation relative to the interior surface 18. The spaced relation between the retaining portion 22 and the interior surface 18 creates a gap or recess 30 below the attachment portion 26 that allows the retaining portion to pass through the vehicle body aperture 20 and hook onto the vehicle body 14 defining a lower portion of the aperture 20.

One drawback of the prior art attachment structure 16 is that it has been known to cause a sink mark 32 on the appearance surface 34 of the cladding 12. To disguise the sink mark 32, the appearance or exterior surface 34 can be textured (i.e., so as not to be a smooth surface) and therefore blend in with the sink mark 32. For example, the exterior surface 34 could be textured (not shown) and left unpainted which would render the sink mark of not much concern, i.e., textured surfaces generally hide small surface flaws, such as sink marks. In some instances, however, it is considered desirable to provide a cladding having a smooth exterior surface and/or a high gloss paint applied to the exterior surface. In such a case, a sink mark, such as sink mark 32, would be unsightly; thus, the mounting arrangement 10 of FIGS. 1 and 2, while well suited for attaching a cladding 12 to a vehicle body 14, does not provide an exterior surface 34 that can be provided as a smooth surface and/or a painted surface while simultaneously providing an aesthetically pleasing appearance (i.e., without being considered unsightly).

Figure 3:
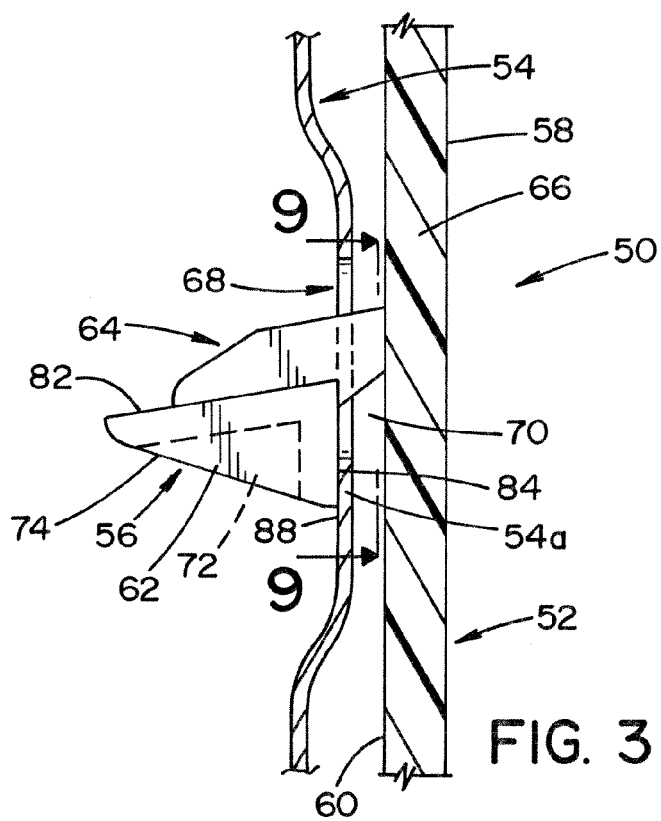
FIG. 3 is a cross-sectional view of an improved mounting arrangement including a cladding having an improved attachment structure received in an aperture of a vehicle body for mounting the cladding to the vehicle body.

With reference to FIG. 3, an improved mounting arrangement 50 is shown for mounting or securing a cladding 52 to a vehicle body 54. The cladding 52 of the mounting arrangement 50 includes at least one integral attachment structure 56 for releasably securing the cladding 52 to the vehicle body 54 without the occurrence of sink marks appearing in the exterior or appearance surface 58 of the cladding. The attachment structure 56 extends from an attachment or interior surface 60 of the cladding 52. The attachment structure 56 includes a retaining portion 62 and an attachment portion 64 which connects the retaining portion 62 to a main body or panel portion 66 of the cladding 52. Like the mounting arrangement of FIGS. 1 and 2, the mounting arrangement 50 includes the attachment structure 56 being received within an aperture 68 defined in the vehicle body 54 for releasably securing the cladding 52 to the vehicle body 54.

Except as indicated herein, the retaining portion 62 of the attachment structure 56 can be the same or similar to the retaining portion 22 of the prior art attachment structure 16. For example, the retaining portion 62 is spaced apart from the interior surface 60 to define a gap or recess 70 which can be hooked onto the vehicle body 54 which defines a lower end of the aperture 68. Also, although only a single attachment structure 56 is shown as being received through a single aperture 68 in the vehicle body 54, it is to be appreciated and understood by those skilled in the art that the cladding 52 may include any number of attachment structures 56 for receipt in corresponding apertures 68 defined in the vehicle body 54.

With additional reference to FIGS. 4-7, the retaining portion 62, which is received through the aperture 68 for securing the body portion 66 to the vehicle body 54, includes a pair of spaced apart recesses 71,72 on an underside 74 of the retaining portion. In the illustrated embodiment, the attachment portion 64 which connects the retaining portion 62 to the interior surface 60 of the cladding 52 is a plurality of spaced apart ribs 76,78,80 (three spaced apart ribs in the illustrated embodiment connecting the retaining portion 62 to the cladding body portion 66). The ribs 76,78,80 are generally vertically extending relative to the vehicle body 54 (and the vehicle) to which the cladding 52 is being secured. As best shown in FIG. 3, the main body or retaining portion 62 of the improved attachment structure 56 appears to be floating relative to the cladding main body portion 66 because it is attached only by the spaced apart ribs 76,78,80 in spaced relation relative to the interior surface 60.

The retaining portion 62 itself is generally wedge-shaped with a first upper side 82, a second engagement side or base 84 and the underside 74, also referred to herein as a third or hypotenuse side. Stated alternatively, the retaining portion 62 is generally a triangular prism wherein the sides 74,82,84 extend between spaced apart lateral sides or faces 90,92. The base 84 is spaced apart from the cladding body portion 66, and specifically from the interior surface 60 adjacent the vehicle body 54, and is generally parallel to the surface 60. As shown, the sides 74,82 extend from the base 84 and generally converge toward one another. The attachment ribs 76,78,80 connect to the sides 82,84 of the retaining portion 62. In particular, the ribs 76,78,80 extend along a significant portion, i.e. approximately three-fourths, of a length of the side 82 in a direction away from the body portion 66. Further, the engagement side 84 engages or contacts an inner side 88 of the vehicle body 54 for purposes of retaining the cladding to the vehicle body. As shown, the attachment portion 64 (ribs 76,78,80 in the illustrated embodiment) extends inwardly relative to the cladding 52 and slightly downwardly so as to maintain the retaining portion 62 spaced apart from the body portion 66.

Figure 4:
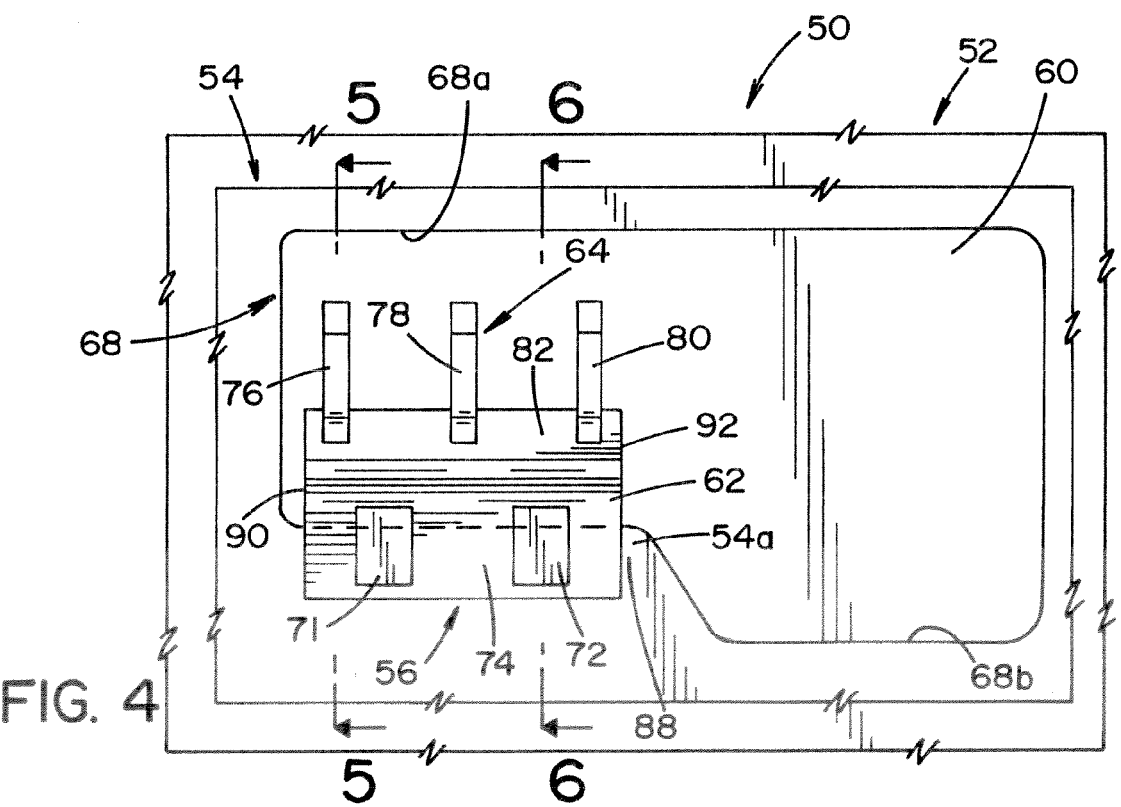
FIG. 4 is an elevational view of the mounting arrangement of FIG. 3 looking toward the cladding and its attachment structure from an inside of the vehicle body.
Figure 5:
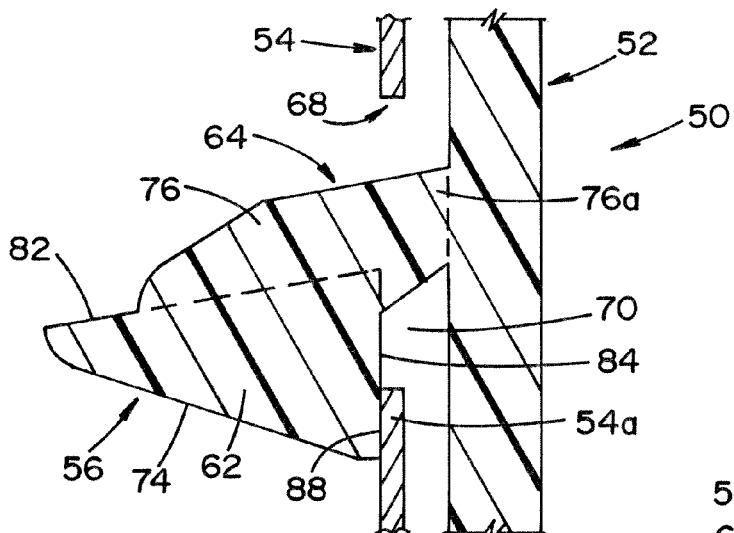
FIG. 5 is a cross-sectional view of the improved mounting arrangement taken at the line 5-5 of FIG. 4.
Figure 6:
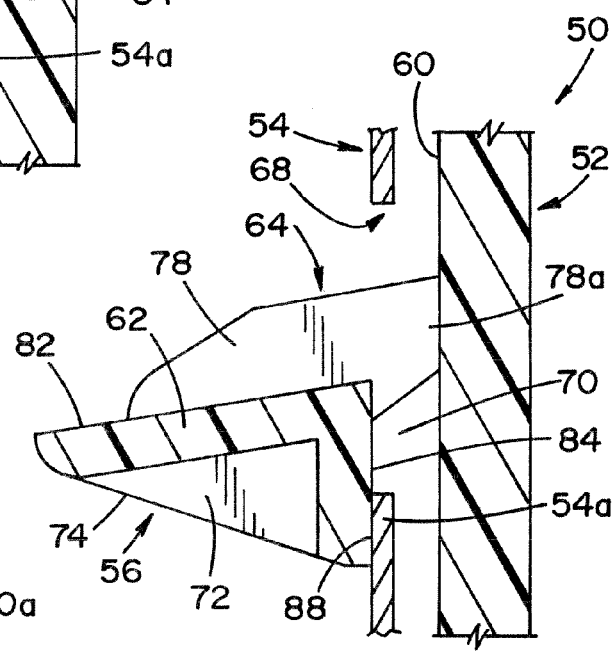
FIG. 6 is a cross-sectional view of the improved mounting arrangement taken at the line 6-6 of FIG. 4.
Figure 7:
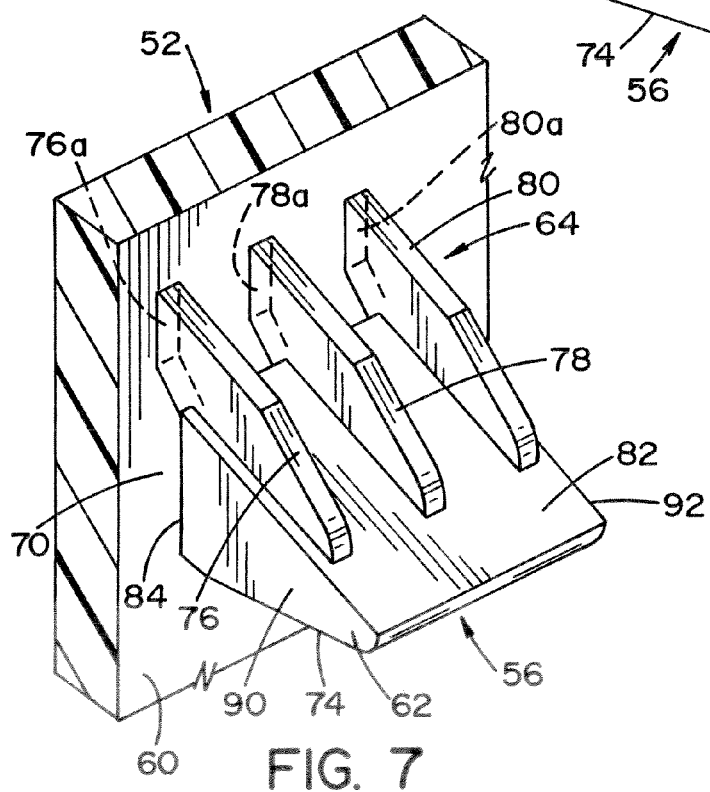
FIG. 7 is a partial perspective view of the improved attachment structure of the cladding of FIG. 3.

The aperture 68 generally includes a first smaller or reduced portion 68a and a second larger or enlarged portion 68b. When the cladding 12 is secured to the vehicle body 54, the attachment structure 56 can be initially passed through the larger aperture portion 68b and the entire cladding is slidably moved along a longitudinal length of the aperture 68 so that the attachment structure 56 ends up positioned within the smaller aperture portion 68a and hooked to the vehicle body 54, as shown in FIG. 4. More particularly, in the smaller aperture portion 68a, the attachment structure 56 can engage wall portion 54a of the vehicle body 54.

The plurality of spaced apart ribs 76,78,80 are spaced apart equally on upper side or surface 82 of the retaining portion 62 and are generally vertically oriented. More particularly, the outer ribs 76,80 are positioned adjacent the lateral sides or side edges 90,92 of the retaining portion 62 and the rib 78 is centrally positioned between the outer ribs 76,80. Thus, the lateral sides 90,92 flank the plurality of ribs 76,78,80. A longitudinal length of the ribs 76,78,80 extends in a direction away from the interior surface 60 of the cladding 52 and each of the ribs includes a small base or profile which is directly attached to the interior surface 60. More particularly, in the illustrated embodiment rib 76 includes base 76a, rib 78 includes base 78a and rib 80 includes base 80a. Each of the bases 76a, 78a, 80a has a rectangular cross section that is elongated vertically relative to the vehicle body 54 and the cladding 52. As already mentioned, the retaining portion 62 is secured to the ribs 76,78,80 in spaced relation relative to the interior surface 60 such that gap or recess 70 is provided between side 84 of the retaining portion and the surface 60 of the cladding 52.

Figure 8:
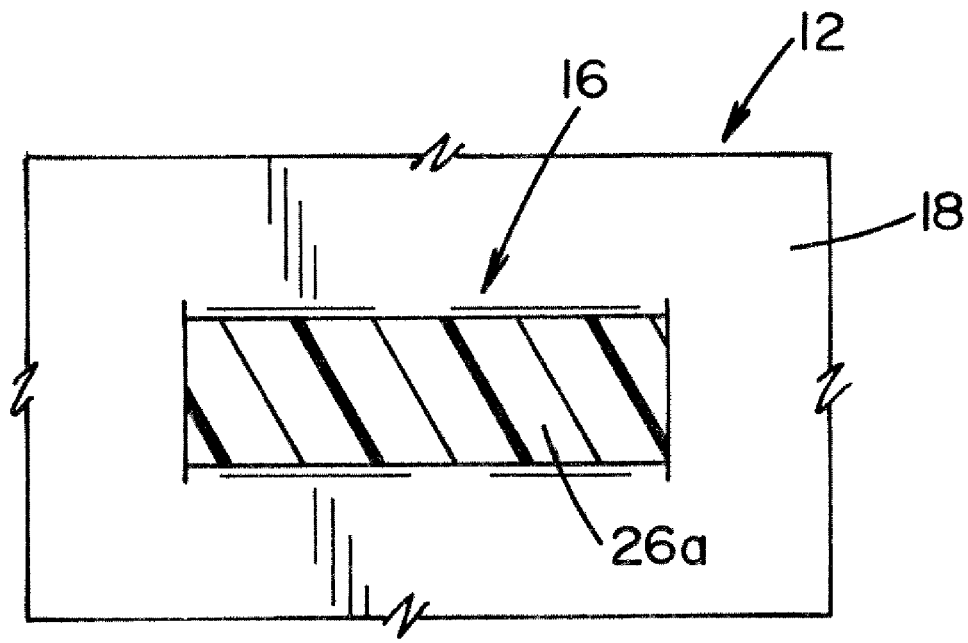
FIG. 8 is a cross-sectional view of the mounting arrangement taken at the line 8-8 of FIG. 1.
Figure 9:
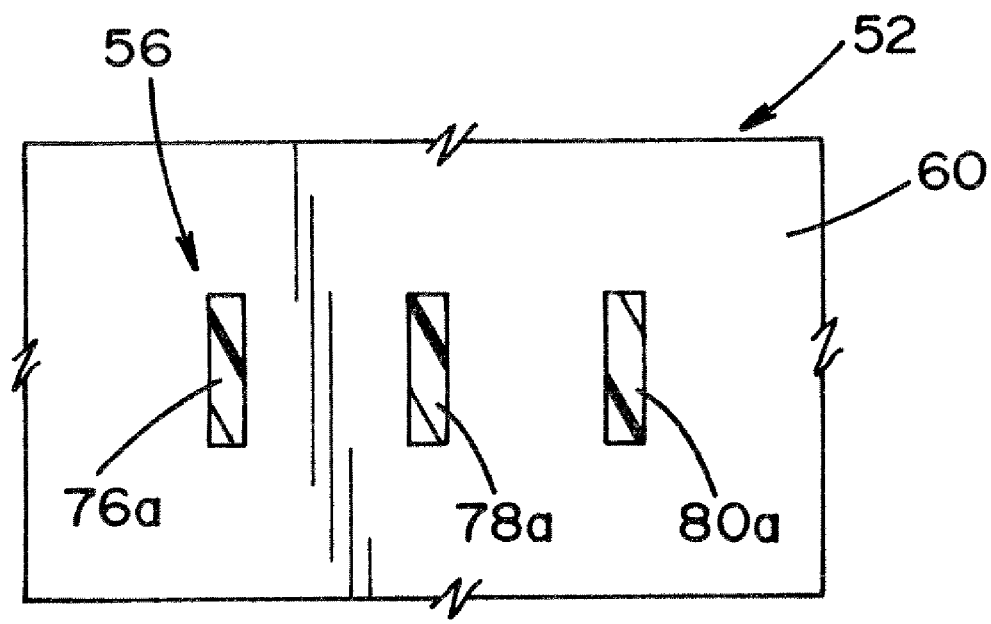
FIG. 9 is a partial cross-sectional view of the improved mounting arrangement taken at the line 9-9 of FIG. 3.

FIGS. 8 and 9 compare an engagement surface or area between the attachment structure 56 (FIG. 9) and the prior art attachment structure 16 (FIG. 8). As shown, the total combined contact surface area of the bases 76a,78a,80a is significantly less than a contact area of base 26a with prior art cladding 12. The use of the plurality of ribs 76,78,80 minimizes contact with the attachment surface 60 and has been found to prevent or substantially reduce the appearance of sink marks, such as sink mark 32, on the exterior surface 58 of the cladding 52 (see FIG. 3). The total combined contact area of the rib bases 76a,78a,80a to the attachment surface 60 of the cladding 52 is less than 10 mm$^2$. This allows the exterior side 58 to be generally smooth and paintable, unlike exterior surface 34 of the prior art cladding 12. A further benefit of the improved attachment structure 56 is that it has been found to provide a more rigid attachment of the cladding 52 to the vehicle body 54.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cladding mounted to a vehicle body, comprising:
a cladding panel with at least one integrally molded attachment structure releasably received through at least one aperture defined through a vehicle body, said at least one attachment structure including a retaining portion having a width received through said at least one aperture, said retaining portion spaced apart from said cladding panel and connecting thereto by a plurality of spaced apart ribs which are spaced apart along said width of said retaining portion.

2. A mounting arrangement for securing a cladding to a vehicle body, said mounting arrangement comprising:
a vehicle body with at least one aperture defined therethrough; and
a cladding having a body portion and at least one attachment structure extending from said body portion and integrally formed therewith, said attachment structure including a retaining portion having a width received through said at least one aperture defined through said vehicle body for securing said body portion to said vehicle body, wherein said retaining portion is spaced apart from said body portion and connected thereto by a plurality of spaced apart ribs, said spaced apart ribs being spaced apart along said width of said retaining portion.

3. The mounting arrangement of claim 2 wherein said retaining portion is generally wedge-shaped and spaced apart from said body portion.

4. The mounting arrangement of claim 2 wherein total contact area between said plurality of ribs and said cladding is less than 10 mm$^2$.

5. The mounting arrangement of claim 2 wherein each of said spaced apart ribs is vertically oriented and extends longitudinally from said body portion.

6. The mounting arrangement of claim 5 wherein each of said spaced apart ribs has a rectangular cross section that is elongated vertically relative to at least one of said vehicle body and said cladding.

7. The mounting arrangement of claim 2 wherein said retaining portion is generally a triangular prism having lateral sides flanking said plurality of spaced apart ribs.

8. The mounting arrangement of claim 7 wherein said triangular prism includes a base spaced apart from an interior surface of said body portion adjacent said vehicle body, said base generally parallel to said interior surface.

9. The mounting arrangement of claim 8 wherein said triangular prism further includes first and second surfaces extending from said base surface and generally converging toward one another, and said plurality of spaced apart ribs connect to said base surface and said first surface.

10. The mounting arrangement of claim 9 wherein each of said plurality of spaced apart ribs extends along a significant portion of said first surface in a direction away from said body portion.

11. The mounting arrangement of claim 10 wherein said significant portion is approximately three-fourths of a length of said first surface in said direction away from said body portion.

12. The mounting arrangement of claim 2 wherein said cladding body portion is a panel having an exterior side and an interior side facing said vehicle body, said at least one integral attachment structure extending toward said vehicle body from said interior side.

13. The mounting arrangement of claim 12 wherein said exterior side is generally smooth and paintable.

14. The mounting arrangement of claim 12 wherein total contact area between said plurality of ribs and said interior side of said cladding is less than 10 mm$^2$.

15. A mounting arrangement for attaching a cladding to a vehicle body, said mounting arrangement comprising:
a cladding member including a body portion and a plurality of attachment structures; and
a vehicle body including a corresponding plurality of apertures defined therethrough, each of said apertures adapted to receive an associated one of said plurality of attachment structures;
wherein each of said plurality of attachment structures includes a retaining portion having a width received through a corresponding one of said apertures and a plurality of spaced apart ribs extending from said body portion and supporting a retaining portion of said attachment structure in spaced relation relative to said body portion for hooking engagement onto said vehicle body said plurality of spaced apart ribs and said retaining portion of each of said plurality of attachment structures are integrally formed with said body portion and said ribs are spaced along the width of said retaining portion.

16. The mounting arrangement of claim 15 wherein each of said plurality of spaced apart ribs, which are generally parallel to one another, have a rectangular cross section with an elongation of said rectangular cross section being vertically oriented.

17. The mounting arrangement of claim 15 wherein said retaining portion is a triangular prism having matching lateral sides, a base and first and second extending sides, said base spaced apart from and generally parallel to said body portion.

18. The mounting arrangement of claim 15 wherein each of said plurality of apertures includes an enlarged portion through which a corresponding attachment structure is initially received and a reduced portion to which said attachment structure is slidably moved for hooking said retaining portion onto a lower portion of said vehicle body defining said reduced portion.

19. The mounting arrangement of claim 15 wherein said cladding body portion is a panel having an exterior side and an interior side facing said vehicle body, said exterior side is generally smooth and paintable and a total contact area between said plurality of ribs of each of said plurality of attachment structures and said interior side of said cladding is less than 10 mm$^2$.

* * * * *